Figure 1:
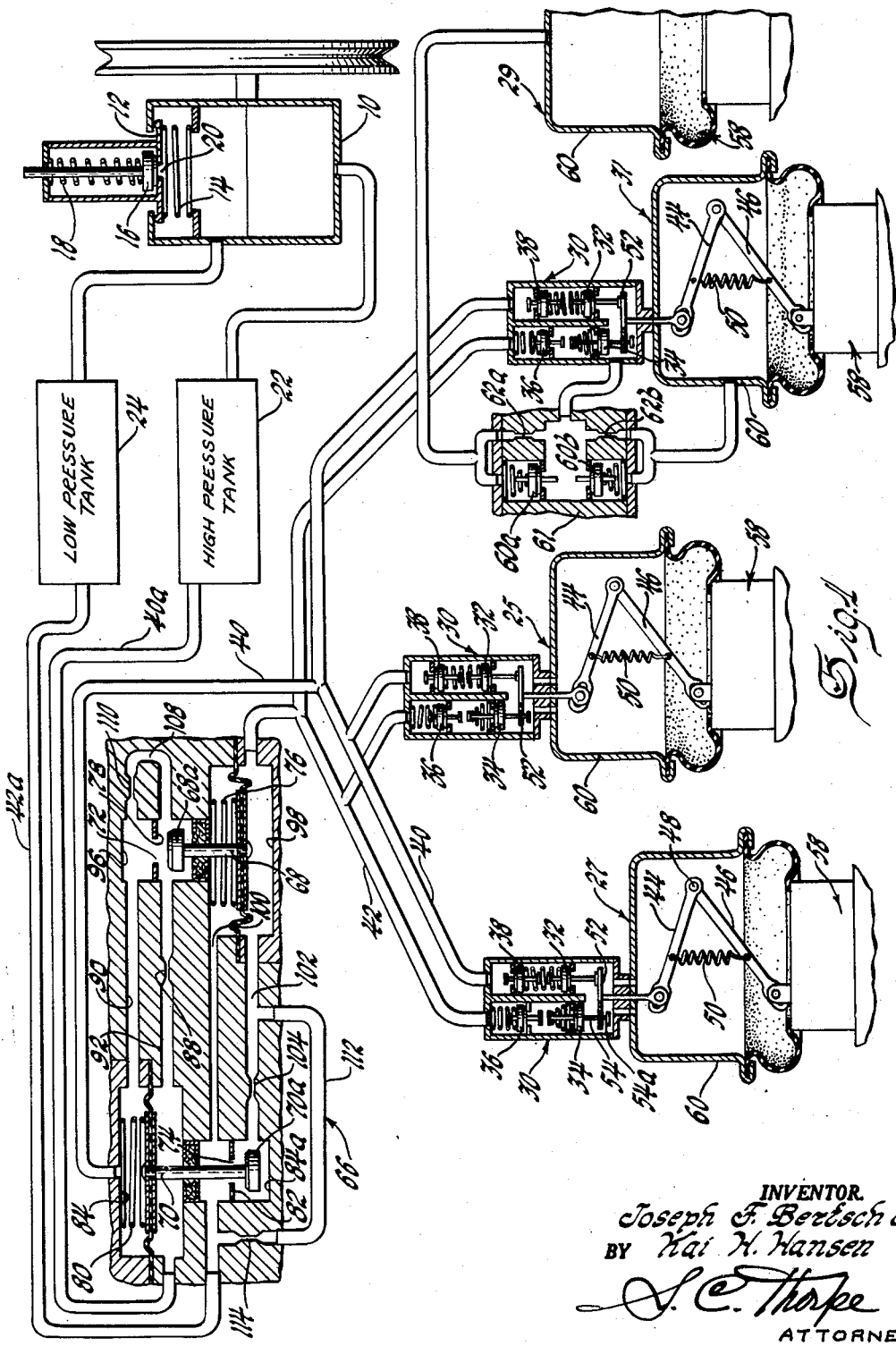

INVENTOR.
Joseph F. Bertsch &
BY Kai H. Hansen
ATTORNEY

INVENTORS
Joseph F. Bertsch &
BY Kai H. Hansen

J. C. Thorpe
ATTORNEY

2,848,249

AIR SUSPENSION LEVELLING SYSTEM

Joseph F. Bertsch and Kai H. Hansen, Detroit, Mich., assignors to General Motors Corporation, Detroit, Mich., a corporation of Delaware Application August 24, 1956, Serial No. 606,155

7 Claims. (Cl. 280—124)

This invention concerns control apparatus for a vehicle suspension system utilizing pneumatic springs in lieu of the conventionally employed metal springs.

Pneumatic springs afford a number of substantial advantages apart from the improved ride they provide. Thus, spring replacement is largely eliminated since there is no metal fatigue; and because of the absence of metal to metal contact lubrication is unnecessary. Incident to the improved riding qualities, body stresses are markedly reduced, road shocks being more completely absorbed with the transmission of fewer vibrations to the body.

Other advantages inherent in air suspension have relation to the ease and rapidity with which the spring height and rate may be changed. With such a suspension, it is possible by charging or discharging air from the springs upon a change in load to maintain the body at a constant level with respect to the axles irrespective of load. This levelling of the vehicle body may be accomplished automatically using equipment presently available. The selected level may be substantially lower than in the instance of a conventionally sprung vehicle, affording significant safety and styling benefits.

With air springs it is necessary to restrict the air lines to prevent undue change in spring height during normal body roll, squat, and dive, making for a more comfortable and safer ride.

Unfortunately, the means heretofore proposed for automatic levelling and air line restriction are too complicated and involved for general adoption. Thus, for the elimination and mitigation of roll, squat, and dive a system of pendulum-governed solenoid valves has been suggested. While such a system is capable of successful operation, the required electric and pneumatic circuitry adds up to a substantial cost and also presents installation problems, best avoided.

The present invention aims toward an air suspension control system which allows for the attainment, without excessive cost, of substantially all of the advantages air suspension is potentially capable of providing.

Another object is to provide a control system which is operated entirely by pneumatic means.

Still another object is to provide such a system which affords a constant levelling action under dynamic as well as static conditions.

An additional object is to provide a control system in the operation of which a minimum amount of air flow occurs as a consequence of normal ride motions.

A still further and more specific object is to provide a control system incorporating means for restricting the air lines when desirable and for maintaining such lines in a relatively open condition at other times, e. g. during loading and unloading of the vehicle.

Figure 2:
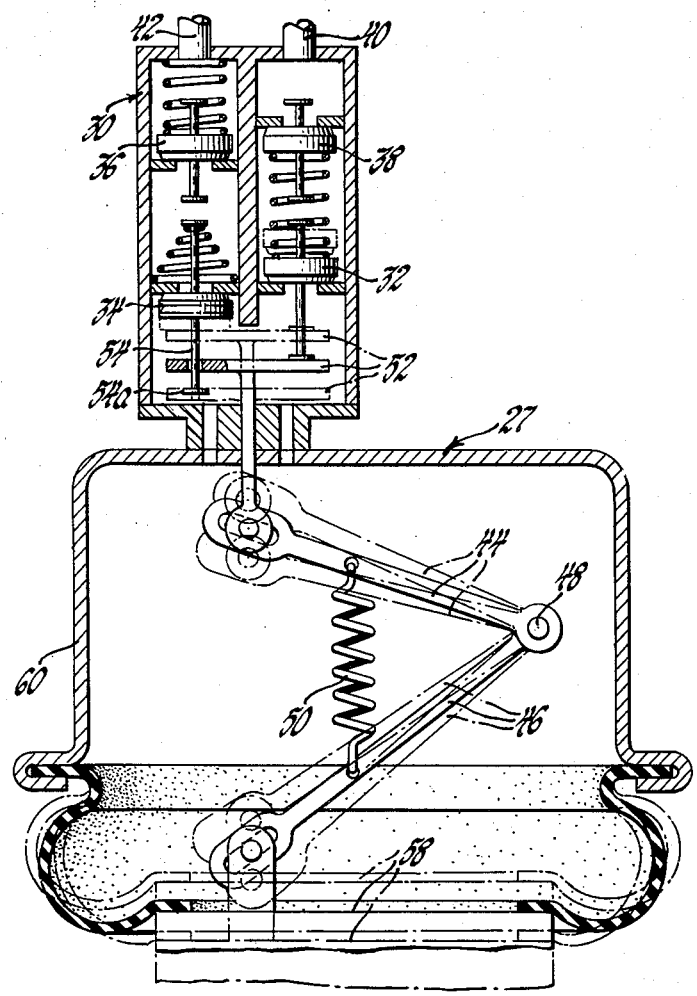
Figure 3:
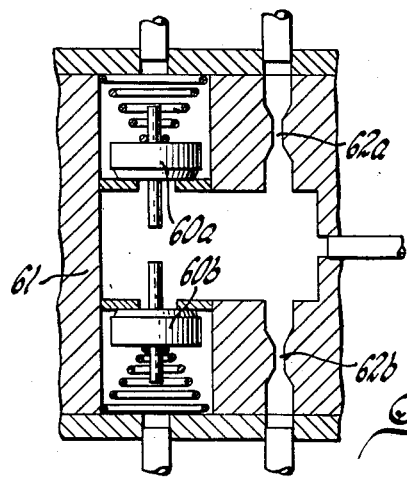

The invention will be particularly described with reference to the accompanying drawing illustrating a preferred embodiment thereof. In the drawings, Figure 1 is a diagrammatic representation of the control system, Figures 2 and 3 are enlargements of certain parts.

Referring to Figure 1, the numeral 10 denotes a compressor, which may be of any suitable type, adapted to be powered by the engine of the vehicle as by belt and pulley. Make up air is drawn from the atmosphere through a valve 12 biased toward closed position by a spring 14. As part of the valve, there is included relief means in the form of a plunger 16 loaded by a spring 18 and normally closing an aperture 20.

The compressor discharges to a tank 22 hereinafter referred to as the "high pressure tank" and draws from a second tank 24 hereinafter called the "low pressure tank." As indicated, the disclosed system is what is called in the art a "closed" system.

In the case of the particular embodiment, four air springs, one located at each wheel, are contemplated. For the purpose of this description, spring 25 should be taken as the left rear spring, spring 27 as the right rear spring, spring 29 as the left front spring, and spring 31 at the right front spring. Each spring, excepting spring 29, has associated therewith a valve assembly 30 comprising an inlet valve 32, an exhaust valve 34, and check valves 36 and 38, the inlet valve and the exhaust valve being respectively connected in parallel to pressure line 40 and exhaust line 42.

Actuation of valves 32 and 34 is shown as effected through levers 44 and 46 pivoted at 48. Lever 44 is connected at its end opposite the pivot to a slidable element 52 having an aperture for the accommodation of a stem 54 comprising a flange 54a of a diameter exceeding that of the aperture. Lever 46 is linked at its lower end to the piston component 58 of the air spring. This component should be considered as fixed to the axle of the vehicle while the part 60 providing the pressure chamber in which the piston moves should be taken as fixedly secured to a sprung member, e. g., the vehicle frame or body. Spring 50 between the levers 44 and 46 provides the force for valve actuation and allows the piston 58 to over travel the valves 32 and 34.

With the arrangement as described and illustrated, it should be clear that on upward movement of the element 52, following from the upward movement of the piston 58, valve 32 is lifted from its seat, resulting in the entry of air from the pressure line 40 past the check valve 38 into the spring. Conversely, on downward movement of the element 52, induced by downward movement of the piston 58, valve 34 is displaced from its seat to allow for the exhaustion of air from the spring into the exhaust or low pressure line 42.

In the drawings, the several parts to which reference has just been made are shown in both solid lines and dot and dash lines (Fig. 2). As shown in solid lines (Fig. 1), the parts are in their normal static position with the vehicle at curb and levelled.

Appearing to the left of the spring 31 in a pair of restrictors 62a, 62b, and a double-acting check valve assembly 61 incorporating spring loaded plungers 60a and 60b. Charging of the spring 29 is marked by elevation of the check valve 60a, charging of the spring 31 by depression of the check valve 60b. Spring 29 can discharge air only through the restrictor 62a while spring 31 can discharge only through restrictor 62b.

In addition to the parts already described, the system includes master valve means 66 comprising a pair of pistons or plungers 68, 70 controlling air flow through passages 72 and 74, respectively. A spring 76 tends to maintain the land 68a of piston 68 off the seat 78. Similarly, piston 70 has associated therewith a spring 80 normally preventing engagement of the land 70a with the seat 82.

The upper portion 84 of the housing confining the piston 70 is open below the piston to the high pressure tank 22 (note line 40a) while the lower portion 84a of such housing is open to the low pressure tank 24 via line 42a. A conduit 90 and a second conduit 92, which has a restrictor 88 therein, interconnect the housing portion 84 with the upper portion 96 of the housing for the plunger 68. The lower portion 98 of the latter housing communicates via conduits 100 and 102 with the housing portion 84a. Interposed in conduit 102 is a restrictor 104 similar to restrictor 88. A by-pass conduit 108 open to the housing portion 96 comprises a restrictor 110 of smaller diameter than the restrictor 88. Similarly, a by-pass line 112 branching from conduit 102 has therein a restrictor 114 of smaller diameter than the restrictor 104.

Pistons 68 and 70 as shown are in the positions they occupy when all of the valves 32 and 34 are closed. As previously pointed out, this is the condition obtaining when the vehicle is at rest with the body levelled, i. e. spaced from the axles a distance set by the adjustment of the mechanism including levers 44 and 46.

*Operation*

Let it be assumed the vehicle is in the process of being loaded, a condition causing upward movement of the pistons 58 with displacement of the valves 32. The resulting air flow to the springs, necessary to maintain the constant spacing between the body and axles, follows the course set by conduits 40a and 92, opening or passage 72, conduit 96, that portion of housing 84 above the head of the plunger 70, and line 40. Such flow proceeds with the development of a pressure differential across the orifice or restrictor 88 in conduit 92, with the higher pressure, of course, at the left of the orifice. Piston 70 is accordingly elevated against the resistance of the spring 80 so that the land 70a engages the seat 82. Thus, any air exhausted to the low pressure tank 24 must pass through the restrictor 114 which, as previously stated, has a diameter substantially less than that of restrictor 104. Since the restrictor 88 offers but little resistance to the air flow from the high pressure tank, the levelling action proceeds rapidly.

Assuming the vehicle is being unloaded rather than loaded, the resulting expansion of the air springs will bring about displacement of the valves 34 from their seats causing flow of air from the springs to the low pressure tank. The course of this flow is set by the line 42, that portion of the housing 98 below the head of the piston 68, conduit 102, housing portion 84a, and conduit 42a. Due to the restrictor 104, a pressure develops below the head of the piston 68 sufficient to move the piston against the resistance of the spring 76 to an extent such as to seat the land 68a. Accordingly, any flow from the high pressure tank 22 must pass through the very narrow restrictor 110. The exhaust flow through the restrictor 104 occurs rapidly, this restrictor like restrictor 88 offering relatively little resistance.

It should be clear that normal loading and unloading of the vehicle does not produce an exhaust movement of one of the levelling valves and a simultaneous supply movement of another and that the levelling proceeds positively without any valve hunting such as occurs in previously proposed systems.

As indicated in the forepart hereof; the disclosed system operates not only to maintain the vehicle body at a selected level but also serves to prevent the rapid transfer of air to and from the air springs under conditions of body roll, squat, and dive. In this connection, let it be assumed that the vehicle is in the process of negotiating a right turn, this tends, of course, to load the springs at the left side and to unload the right side springs. Thus a condition of simultaneous air charging and air discharging occurs. Under this condition, due to the restrictors 88 and 104 both passages 72 and 74 become closed and any air flow into or out of the air springs is limited with consequent little change in spring height after the vehicle has negotiated the turn and recovered to a straight ahead normal ride position.

It should be obvious that rapid air transfer during squatting of the vehicle, induced by a quick start, or diving thereof, induced by abrupt braking, is similarly resisted since in either instance, just as under roll conditions, both of the pistons 68 and 70 become displaced to closed position restricting the air flow.

Considering that only a single levelling valve 30 is employed for both of the front springs 29 and 31 and considering further that the valve is controlled by spring 31 only, it might be supposed that in a roll caused by a right turn little resistance would be provided by spring 29. Actually, the resistance to roll has been found to be essentially the same irrespective of the direction of turn. This should be readily understood when it is recognized that air tending to leave the spring 29 because of the counterclockwise roll cannot rush to exhaust, despite the valve 34 associated with the spring 31 being open, because of the restriction 62a and the closing of passageway 74.

We claim:

1. Control means for a pneumatic suspension system having a source of air pressure, means for exhausting air from the system and a plurality of air springs in the air circuit between said source and said exhaust means, said circuit including a pressure line from said source to each said spring and an exhaust conduit from each said spring to said exhaust means, said control means comprising an inlet valve and an exhaust valve at each spring controlled by mechanical means actuated as determined by the degree of expansion or contraction of the spring, and master valve means through which all air from said source and to said exhaust means flows, said master valve means including first and second components, said first component receiving air from said source and having an outlet to said springs incorporating a first restriction and a second, normally by-passed smaller restriction, said second component receiving air from said springs and having an outlet to said exhaust means incorporating similar restrictions, the smaller being normally by-passed, each of said components being actuated by a predetermined pressure drop across the corresponding first restriction whereby the air from the other component is compelled to flow through the corresponding second restriction.

2. Control means for a pneumatic suspension system having a source of air pressure, means for exhausting air from the system and a plurality of air springs in the air circuit between said source and said exhaust means, said circuit including a pressure line from said source to each said spring and an exhaust conduit from each said spring to said exhaust means, said control means comprising an inlet valve and an exhaust valve for each spring controlled by height-sensing means, and orifice-controlled pressure responsive means common to all of said springs operating to restrict the air flow to the inlet valves and from the exhaust valves under predetermined conditions.

3. Control means for a pneumatic suspension system comprising a high pressure tank and a low pressure tank together with a compressor drawing from said low pressure tank and charging to said high pressure tank and further comprising a plurality of air springs in circuit between said tanks, said circuit including a pressure line from said high pressure tank to each said spring and an exhaust conduit from each said spring to said low pressure tank, said control means including an inlet valve and an exhaust valve at each spring governed by mechanical means actuated as determined by the degree of expansion or contraction of the spring, and master valve means through which all air from said high pressure tank and to said low pressure tank flows, said master valve means incorporating first and second components, said first component receiving air from said high pressure tank and having an outlet to said springs including a first restriction and a second, normally by-passed smaller restriction, said second component receiving air from said springs and having an outlet to said low pressure tank incorporating similar restrictions, the smaller being normally by-passed, each of said components being actuated by a predetermined pressure drop across its corresponding first restriction whereby the air from the other component is compelled to flow through its corresponding second restriction as well as through its corresponding first restriction.

4. Control means for an automotive pneumatic suspension system having a source of air pressure, means for exhausting air from the system and a plurality of air springs, including a front pair and a rear pair, in circuit between said source and said exhaust means, said circuit including a pressure line from said source to each said spring and an exhaust conduit from each said spring to said exhaust means, said control means comprising a separate inlet valve and a separate exhaust valve for each rear spring and an inlet valve and an exhaust valve serving both of said front springs, said inlet and exhaust valves being controlled by height-sensing means, and orifice-controlled pressure responsive means common to all of said springs operating to restrict the air flow to the inlet valves and from the exhaust valves under predetermined conditions.

5. Control means according to claim 4 wherein each of said front springs exhausts through an orifice located between the spring and the exhaust valve serving the front springs.

6. Control means for an automotive pneumatic suspension system having a source of air pressure, means for exhausting air from the system and a plurality of air springs, including a front pair and a rear pair, in circuit between said source and said exhaust means, said circuit including a pressure line from said source to each said spring and an exhaust conduit from each said spring to said exhaust means, said control means comprising a separate inlet valve and a separate exhaust valve for each rear spring and an inlet valve and an exhaust valve serving both of said front springs, said inlet and exhaust valves being controlled by mechanical means actuated as determined by the degree of expansion or contraction of said rear springs and one of said front springs, and master valve means through which all air from said source and to said exhaust means flows, said master valve means including first and second components, said first component receiving air from said source and having an outlet to said inlet valves incorporating a first restriction and a second, normally by-passed, smaller restriction, said second component receiving air from said exhaust valves and having an outlet to said exhaust means incorporating similar restrictions, the smaller being normally by-passed, each of said components being actuated by a predetermined pressure drop across the corresponding first restriction whereby the air from the other component is compelled to flow through the corresponding second restriction.

7. Control means for a pneumatic suspension system comprising a high pressure tank and a low pressure tank together with a compressor drawing from said low pressure tank and charging to said high pressure tank and further comprising a plurality of air springs in circuit between said tanks, said circuit including a pressure line from said high pressure tank to each said spring and an exhaust conduit from each said spring to said low pressure tank, said control means including an inlet valve and an exhaust valve together with corresponding check valves at each spring, said inlet and exhaust valves being governed by mechanical means actuated as determined by the degree of expansion or contraction of the spring, and master valve means through which all air from said high pressure tank and to said low pressure tank flows, said master valve means incorporating first and second diaphragm piston members, said first diaphragm piston member receiving air from said high pressure tank and having an outlet to said inlet valves including a first restrictor and a second, normally by-passed, smaller restrictor, said second diaphragm piston member receiving air from said exhaust valves and having an outlet to said low pressure tank incorporating similar restrictors, the smaller being normally by-passed, each of said members being actuated by a predetermined pressure drop across its corresponding first restrictor whereby the air from the other member is compelled to flow through its corresponding second restrictor as well as through its corresponding first restrictor.

References Cited in the file of this patent

UNITED STATES PATENTS

| | | |
|---|---|---|
| 1,464,680 | Lassen | Aug. 14, 1923 |
| 2,674,092 | Gardiner | Apr. 6, 1954 |